United States Patent [19]
Nakayama et al.

[11] Patent Number: 5,974,394
[45] Date of Patent: Oct. 26, 1999

[54] SCHEDULE RETRIEVAL METHOD FOR CONTROLLING SCHEDULES AND SCHEDULE SERVER APPARATUS WITH MULTISTAGEOUS IDLE-TIME RETRIEVAL MEANS

[75] Inventors: Yoshinori Nakayama, Tokyo; Tadashi Miyazaki, Toda, both of Japan

[73] Assignee: Hitachi, Ltd., Tokyo, Japan

[21] Appl. No.: 08/931,655

[22] Filed: Sep. 16, 1997

[30] Foreign Application Priority Data

Sep. 17, 1996 [JP] Japan ................................. 8-244472

[51] Int. Cl.⁶ ..................................................... G06F 17/60
[52] U.S. Cl. ................................... 705/8; 705/9; 368/29; 395/100; 345/156
[58] Field of Search ........................... 705/8, 401, 407, 705/9; 40/107; 368/29; 395/100; 345/156

[56] References Cited

U.S. PATENT DOCUMENTS 5,124,912   6/1992   Hotaling et al. ........................ 40/107

FOREIGN PATENT DOCUMENTS

A-5-134989    6/1993   Japan .
A-5-181867    7/1993   Japan .
A-6-332906   12/1994   Japan .
A-7-182416    7/1995   Japan .

*Primary Examiner*—James P. Trammell
*Assistant Examiner*—Nga B. Nguyen
*Attorney, Agent, or Firm*—Antonelli, Terry, Stout & Krauss, LLP

[57] ABSTRACT

A method in which idle time retrieval is not lumped together but divided multistageously so that a burden on a host person for retrieving idle time for subjects of participation is lightened. The subjects of participation are divided into some groups so that idle time is retrieved group by group on the basis of a given retrieval condition. The retrieval is continued unless the retrieval is completed for all the groups.

14 Claims, 8 Drawing Sheets

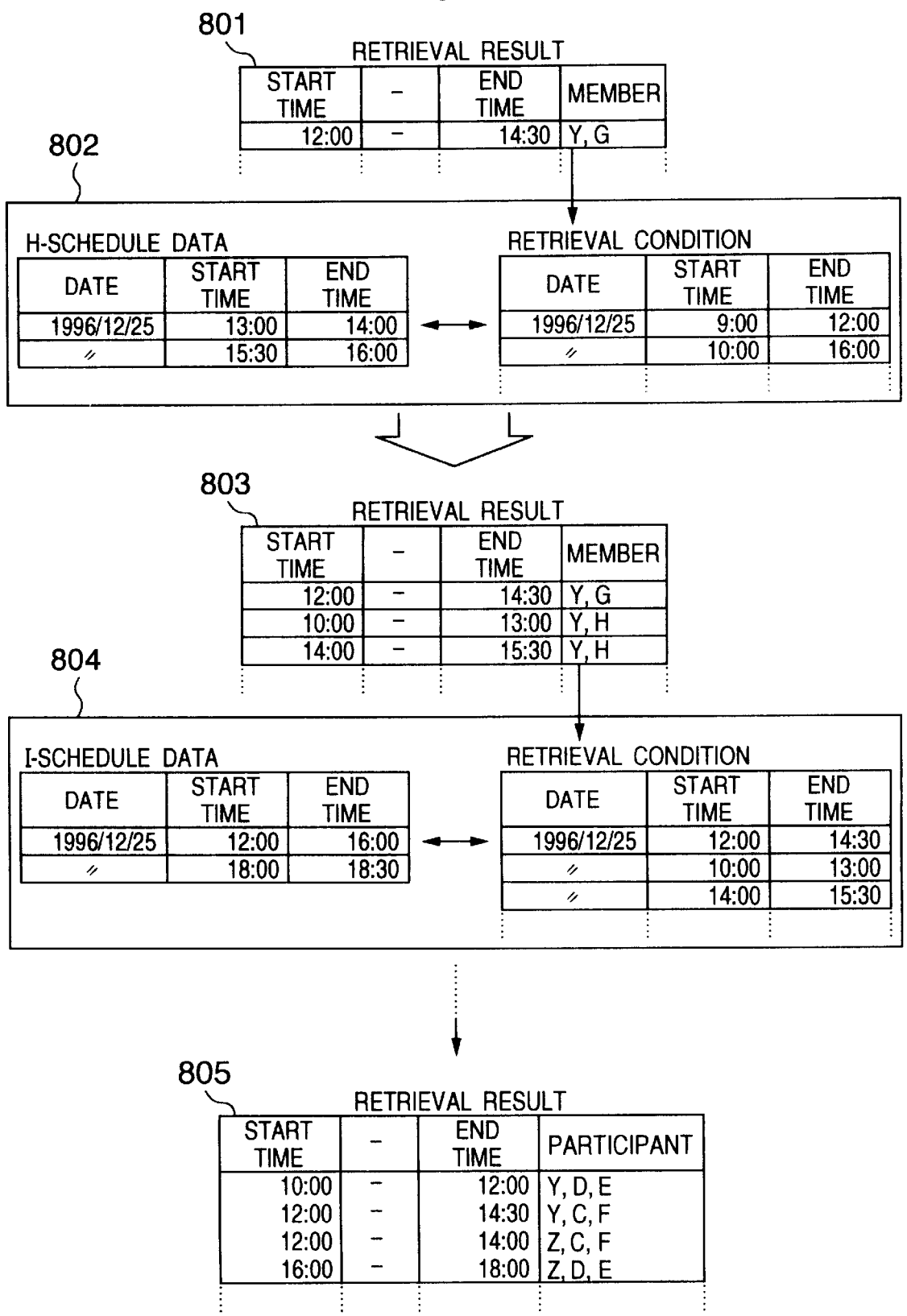

SCHEDULE RETRIEVAL METHOD FOR CONTROLLING SCHEDULES AND SCHEDULE SERVER APPARATUS WITH MULTISTAGEOUS IDLE-TIME RETRIEVAL MEANS

BACKGROUND OF THE INVENTION

The present invention relates to a schedule management system for transmitting and receiving individual and equipmental schedule data between individuals and equipments.

For example, even in the case where a host person of a meeting in an office beforehand informs subjects of participation in the meeting of the date when the meeting will be held, the host person must sufficiently grasp the schedules of the subjects of participation to reduce the number absentees as much as possible.

A technique described in JP-A-5-181867 is a known example most relevant to the present invention.

In the conventional technique, a place retrieval function for retrieving the place for the meeting to be suitable to the scheduled date of the meeting and a term retrieval function for calculating the date on which the largest number of persons will participate in the meeting are used in the schedule management system to thereby make it possible to aid the generation of notice of the meeting on the schedule to reduce the number absentees as much as possible.

There is however a first problem in the conventional technique that the place retrieval function and the term retrieval function need be used repetitively, so that the host person must re-input or correct the date of the meeting because these functions must be executed repetitively unless an expected result is obtained.

There is a second problem that the date on which absentees will be reduced most extremely is not always an optimum retrieval result because the participants are different in significance in accordance with the schedule of the meeting to be held. Practically, the participants are different in significance judged by the host person as to whether they are essential participants or optional participants. Accordingly, such a date on which the largest number of participants can attend the meeting but some essential participants can not attend the meeting may be retrieved.

There is a third problem that there is no means for retrieving the schedule of the meeting for a person representing an arbitrary group because the schedules for the participants are inputted individually when the term retrieval function is used. In the case of such a schedule, the date most suitable to the condition in which at least one representative participant is selected from a group necessary for participation in the meeting is required.

As described above, it is important that the schedule management system is used to make a schedule just as the host person of the meeting designs.

SUMMARY OF THE INVENTION

A computer system according to the present invention is configured such that terminal systems allocated to a host person and subjects of participation are connected to each other so that data can be transmitted and received between these terminal systems, and the computer system is provided with a schedule management function for storing schedules of the host person and the subjects of participation, and a function for storing equipmental schedules reserved by the host person separately from the schedules of the host person and the subjects of participation.

According to the present invention, the problems in the schedule management system is solved by the provision of the following functions.

To solve the aforementioned first problem, as in the multistageous idle-time retrieval system, schedules registered for participants and equipments are divided into a plurality of groups so that an idle-time retrieval result for one group is re-set in a retrieval condition for retrieving idle time for another group. By this function, the retrieval can be narrowed to the retrieval result to be intended by the host person.

To solve the aforementioned second problem, there is provided a function for setting significance for the participants and equipments. Schedules of participants and equipments are classified into groups by significance so that idle-time retrieval is executed multistageously. As a result, idle time can be retrieved so that the significance of the participants and equipments is satisfied.

To solve the aforementioned third problem, there is provided a function for registering equipments and participants in a plurality of special groups. At least one participant or at least one equipment in each special group must satisfy an idle-time retrieval condition. By the registration of the special groups, the date of the meeting by arbitrary persons representing the special groups using an arbitrary equipment can be retrieved.

BRIEF DESCRIPTION OF THE DRAWINGS

FIG. 8 is a processing view for explaining the embodiment of the present invention by way of specific example particularly in the case where special group definition is provided.

DESCRIPTION OF THE PREFERRED EMBODIMENT

An embodiment of the computer system according to the present invention will be described below with reference to the drawings.

Figure 1:
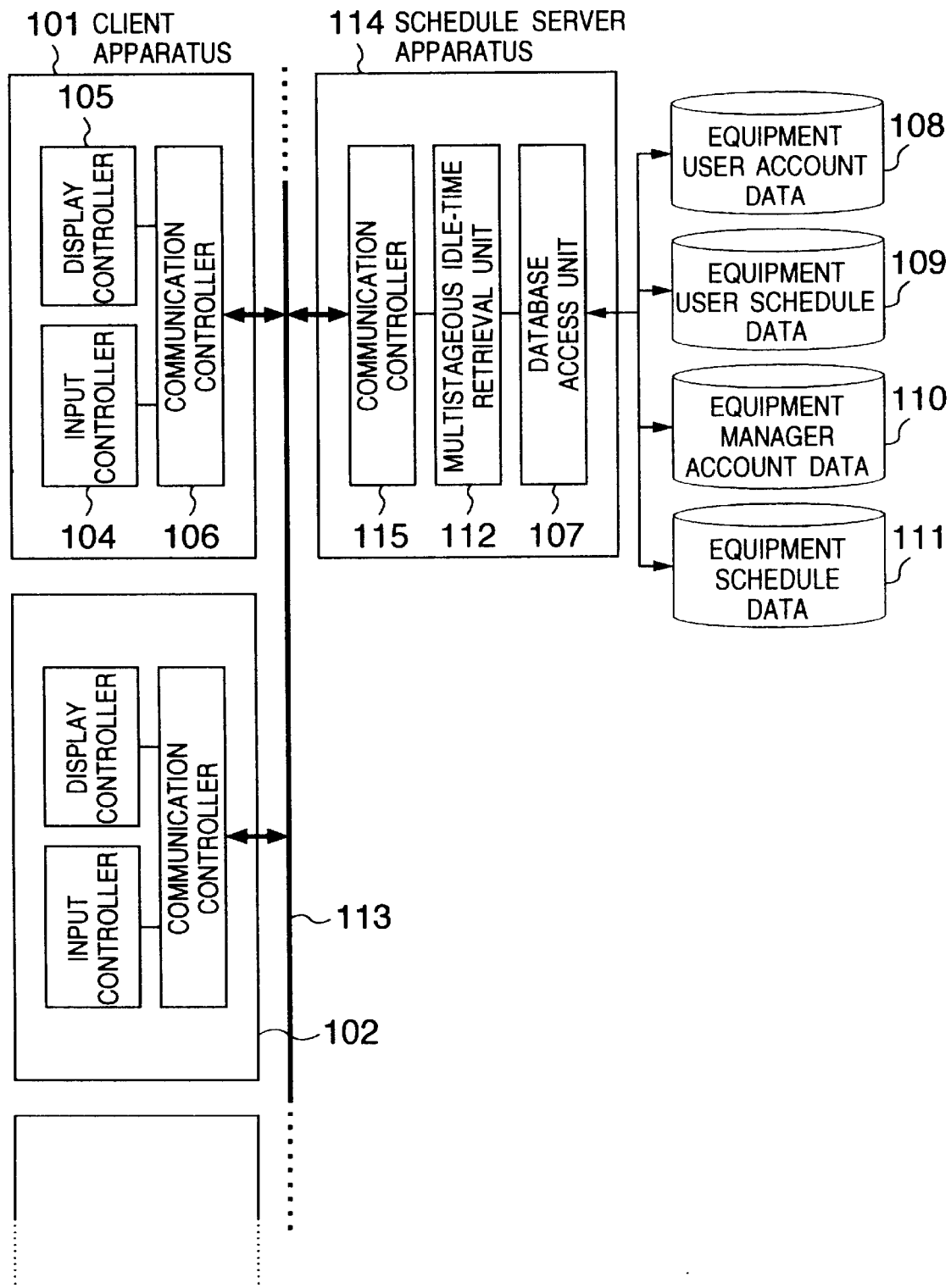
FIG. 1 is a functional configuration view of a computer system as an embodiment of the present invention.

FIG. 1 shows a functional configuration view of the computer system in this embodiment.

As shown in FIG. 1, the computer system in this embodiment is designed so that a plurality of client apparatuses 101, 102, . . . are connected to a schedule server apparatus 114 through a communication line 113. The schedule server apparatus 114 is connected to databases 108 to 111 in which various kinds of information are stored.

The plurality of client apparatuses 101, 102, . . . are allocated to a host person and subjects of participation with respect to a meeting. For example, in FIG. 1, the client apparatus 101 is allocated to a host person of a meeting and the client apparatus 102 is allocated to a participant of the meeting.

Incidentally, the configuration of the client apparatus 101 is the same as that of the client apparatus 102 so that each client apparatus may be used by a host person or by a subject of participation.

In this embodiment, the client apparatus 101 has an input controller 104 for permitting data inputting for performing schedule inputting of the host person or the subject of participation of the meeting and performing idle-time retrieval, a display controller 105 for displaying an input schedule and outputting retrieval results for persons and equipments, and a communication controller 106 for transmitting and receiving data between the schedule server apparatus 114 and the client apparatuses 101 and 102.

The schedule server apparatus 114 is connected to various databases 108 to 111 which will be described later, and has a database access unit 107 for making access to the various databases 108 to 111, a multistageous idle-time retrieval unit 112 as a function for retrieving idle time for subjects of participation or equipments in a term designated by the host person, and a communication controller 115 for transmitting data to the client apparatuses 101, 102, . . . and receiving data from the client apparatuses 101, 102, . . . , through the communication line 113. The above-mentioned databases include an equipment user account database 108, an equipment user schedule database 109 for storing schedules of the subjects of participation and the host person, an equipment manager account database 110 and an equipment schedule database 111 for storing schedules of equipments.

With respect to the multistageous idle-time retrieval means 112 in this embodiment, an overall processing procedure for retrieving idle time for subjects of participation will be described with reference to FIG. 2 and the processing procedure in FIG. 2 will be described on the basis of specific data with reference to FIGS. 3 and 4.

Incidentally, it is assumed now that schedules for subjects of participation are inputted one by one through the input controller 104.

Figure 2:
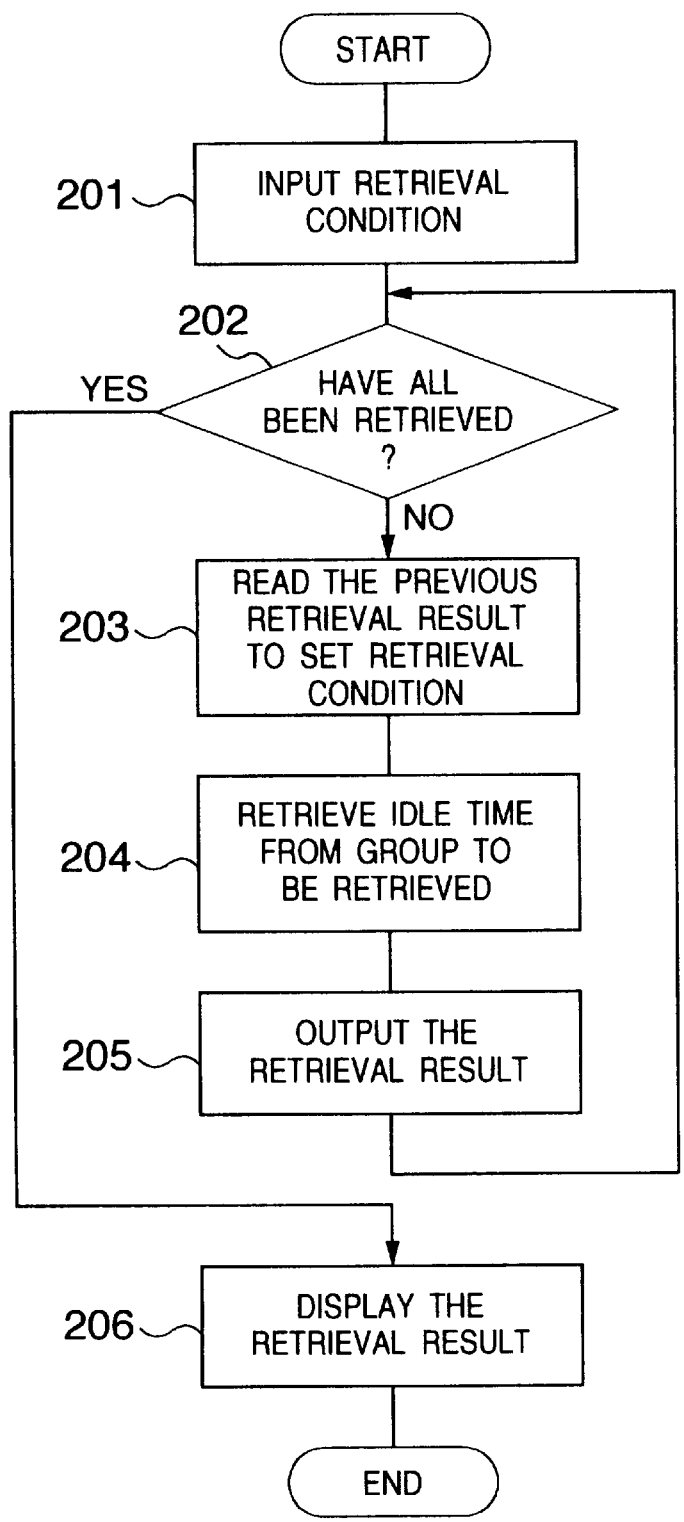
FIG. 2 is a flow chart of an operating procedure in the embodiment of the present invention.
Figure 3:
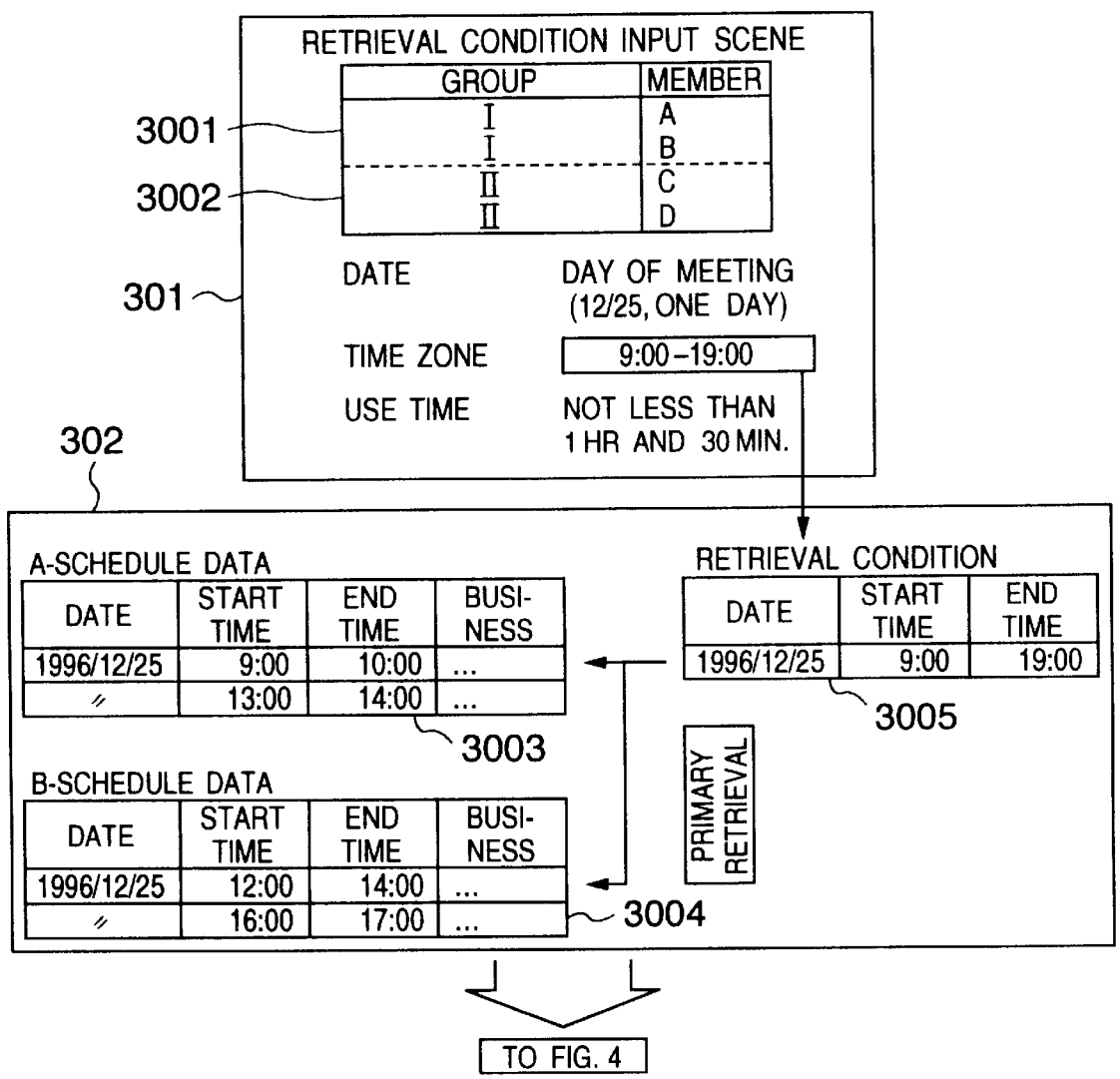
FIG. 3 is a processing view for explaining the operating procedure in the embodiment of the present invention by way of specific example.
Figure 4:
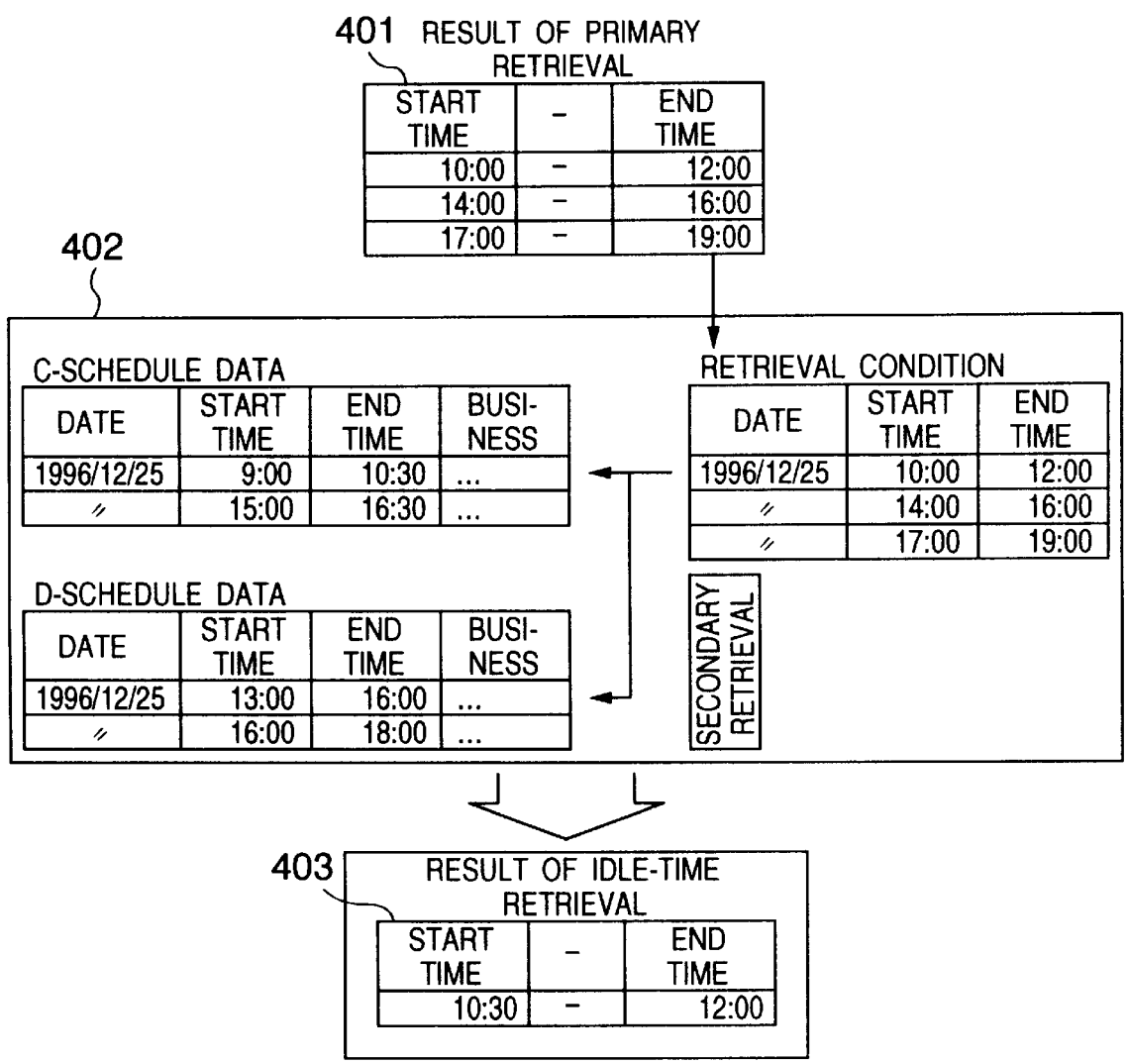
FIG. 4 is a processing view for explaining the operating procedure in the embodiment of the present invention by way of specific example.

First, the host person in an event such as a meeting, or the like, selects some groups of subjects of participation for the meeting and inputs other conditions (step 201 in FIG. 2, and step 301 in FIG. 3).

Because retrieval is not completed yet at this point of time, step 202 shifts the control to step 203.

In step 301 as shown in FIG. 3, idle time from 9 o'clock to 19 o'clock is searched as a condition. This is made to be a retrieval condition 3005.

Here, idle-time retrieval is made for Group-I 3001 (steps 204 and 302). In this embodiment, first, comparison is made between A-schedule data 3003 and a retrieval condition (meeting-holding condition) 3005. From 9 o'clock to 13 o'clock the A-schedule data 3003 has idle time from 10 o'clock to 13 o'clock and from 14 o'clock to 19 o'clock. This result is used as a new retrieval condition for B-schedule data 3004. A result 401 as shown in FIG. 4, which shows that the idle time common to this new retrieval condition and the B-schedule data 3004 is from 10 o'clock to 12 o'clock, from 14 o'clock to 16 o'clock and from 17 o'clock to 19 o'clock, is obtained and stored in a memory (not shown) in the schedule server apparatus 114.

Because control is further shifted to step 202 but retrieval is not completed yet, step 202 shifts control to the step 203.

In the step 203, the previous retrieval result 401 is used as a retrieval condition in the current retrieval.

Here, idle-time retrieval is made for Group-II 3002 in the same manner as in the Group-I 3001 (steps 204 and 402).

In step 205, a retrieval result is obtained and stored in the memory of the schedule server apparatus 114.

Because control is further shifted to the step 202 and retrieval is completed at this point of time, step 202 shifts control to step 206.

Here, the retrieval result is displayed on the display controller 105 of the client apparatus 101 through the communication controller 115 of the schedule server apparatus 114 and the communication controller 106 of the client apparatus 101, so that the content of the display shows a result 403 requested by the host person (step 206).

The above description is the gist of the multistageous idle-time retrieval method.

Next, the case where the retrieval method is divided more multistageously to widen the retrieval condition will be described below.

Processing using specific data in this embodiment will be described with reference to FIGS. 5 and 6.

When retrieval conditions are inputted, degrees of significance can be given to the respective subjects of participation of the meeting to be held as to whether each subject of participation is essential or not. Significance may be classified into two values, good and bad, or may be classified into several values.

In this embodiment, three values "essential" 511, "optional" 512 and "selective" 513 are prepared as degrees of significance. Here, "essential" means an essential participant for the meeting, "optional" means an optional participant and "selective" means a specially unnecessary participant.

Figure 5:
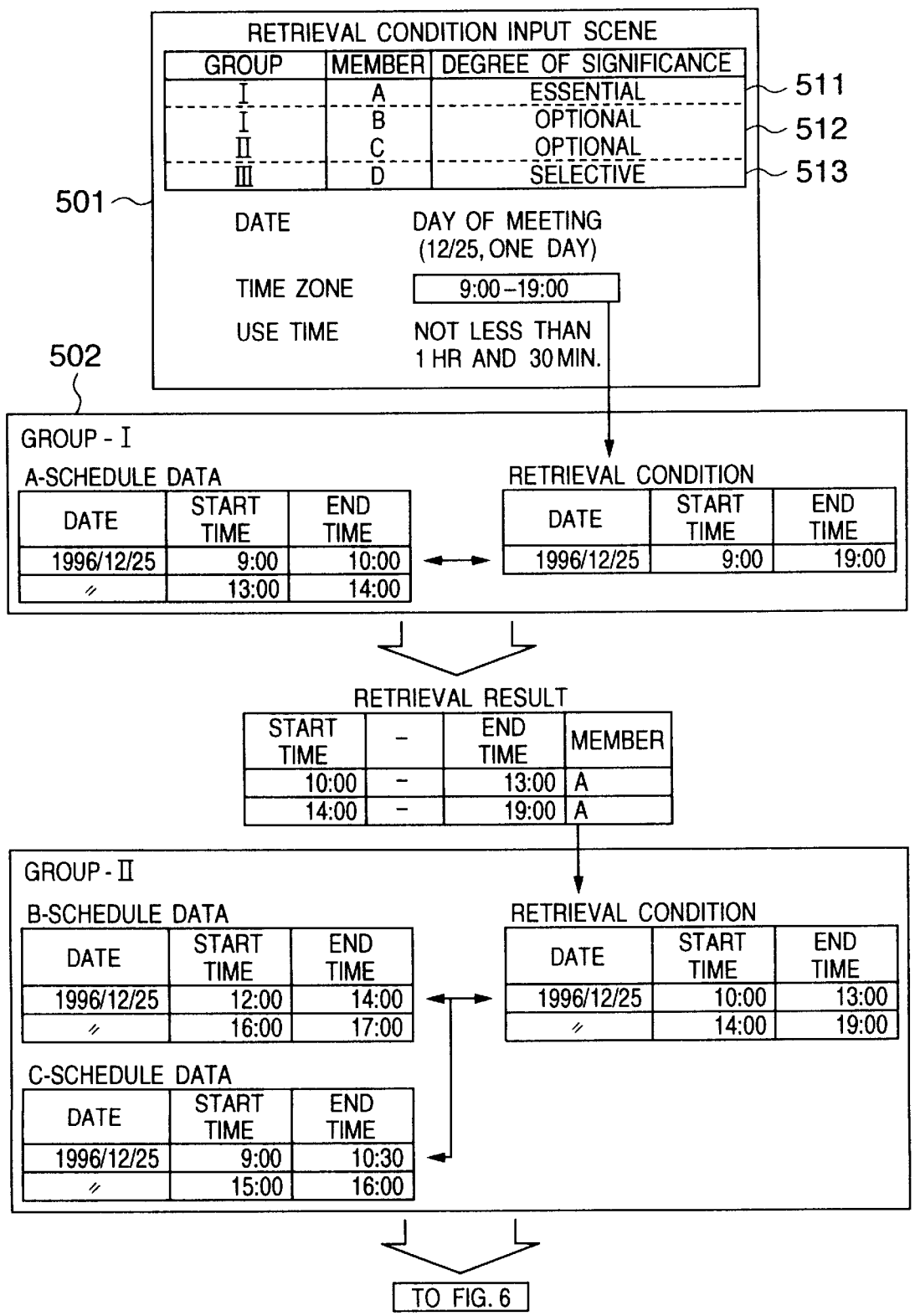
FIG. 5 is a processing view for explaining the embodiment of the present invention by way of specific example particularly in the case where degrees of significance are given to participants.
Figure 6:
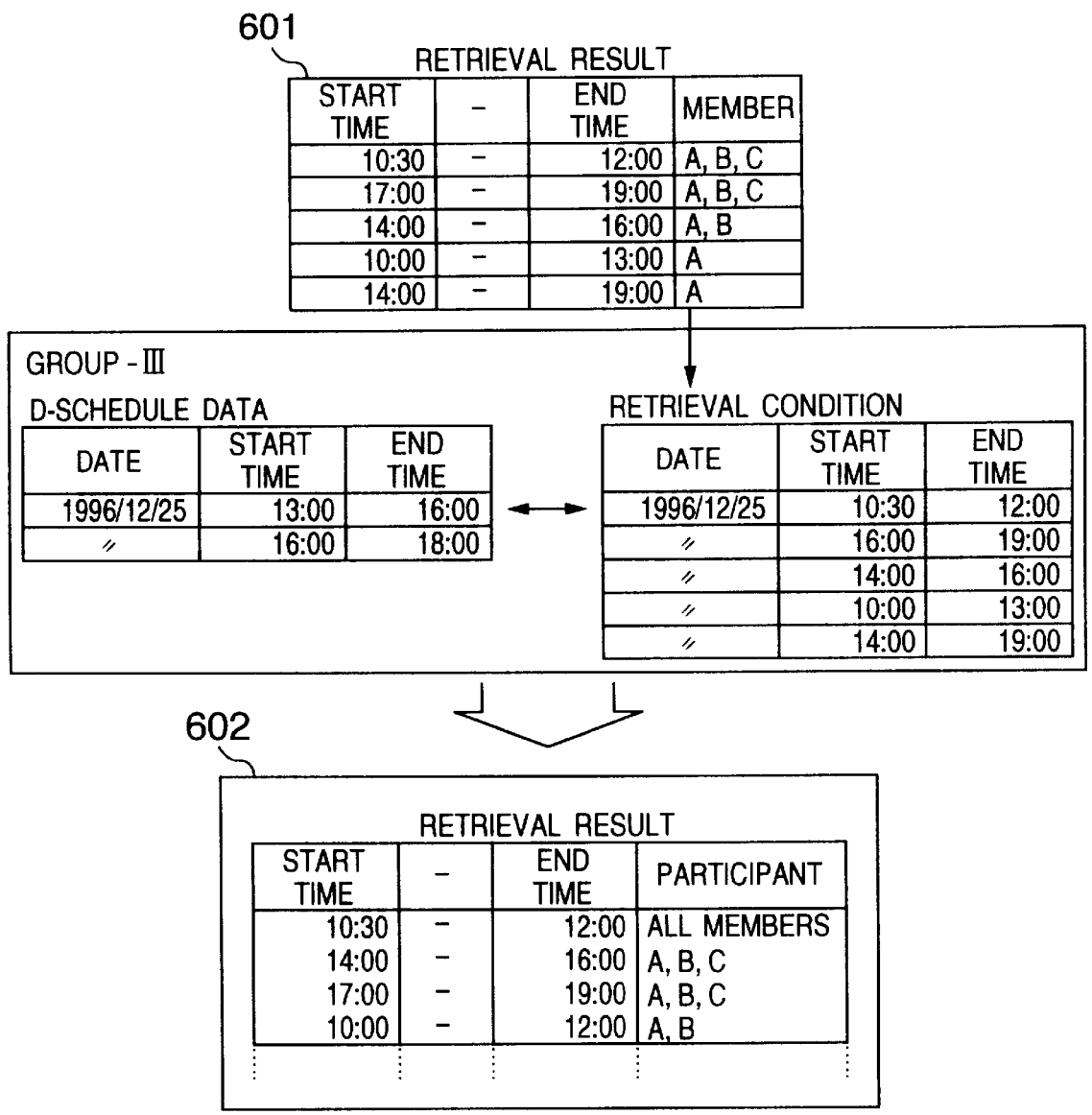
FIG. 6 is a processing view for explaining the embodiment of the present invention by way of specific example particularly in the case where degrees of significance are given to participants.

In an input example 501 in FIG. 5, as the degrees of significance expressing whether essential or not for the meeting to be held, Group I is set to "essential" 511, Group II is set to "optional" 512 and Group III is set to "selective" 513.

The input condition is directly used as the retrieval condition so that idle time common to the Group I and the input condition is retrieved by the multistageous idle-time retrieval unit 112 (502).

After that, retrieval by the multistageous idle-time retrieval means 112 is performed group by group and the retrieval result is additionally and successively stored in the memory of the schedule server apparatus 114 without changing the idle time zone determined by the previous retrieval result.

For example, because a member belonging to the Group I is essential, idle time common to the Group I and the retrieval condition is necessarily stored in the memory. On the other hand, the retrieval result for the Group II is as shown in 601. That is, while the idle time common to the Group I and the input condition remains in the memory, idle time common to the Group I and the Group II is additionally stored in the memory. The same rule applies also to the Group III. Finally, a result in accordance with priority is outputted as the retrieval result 602.

Figure 7:
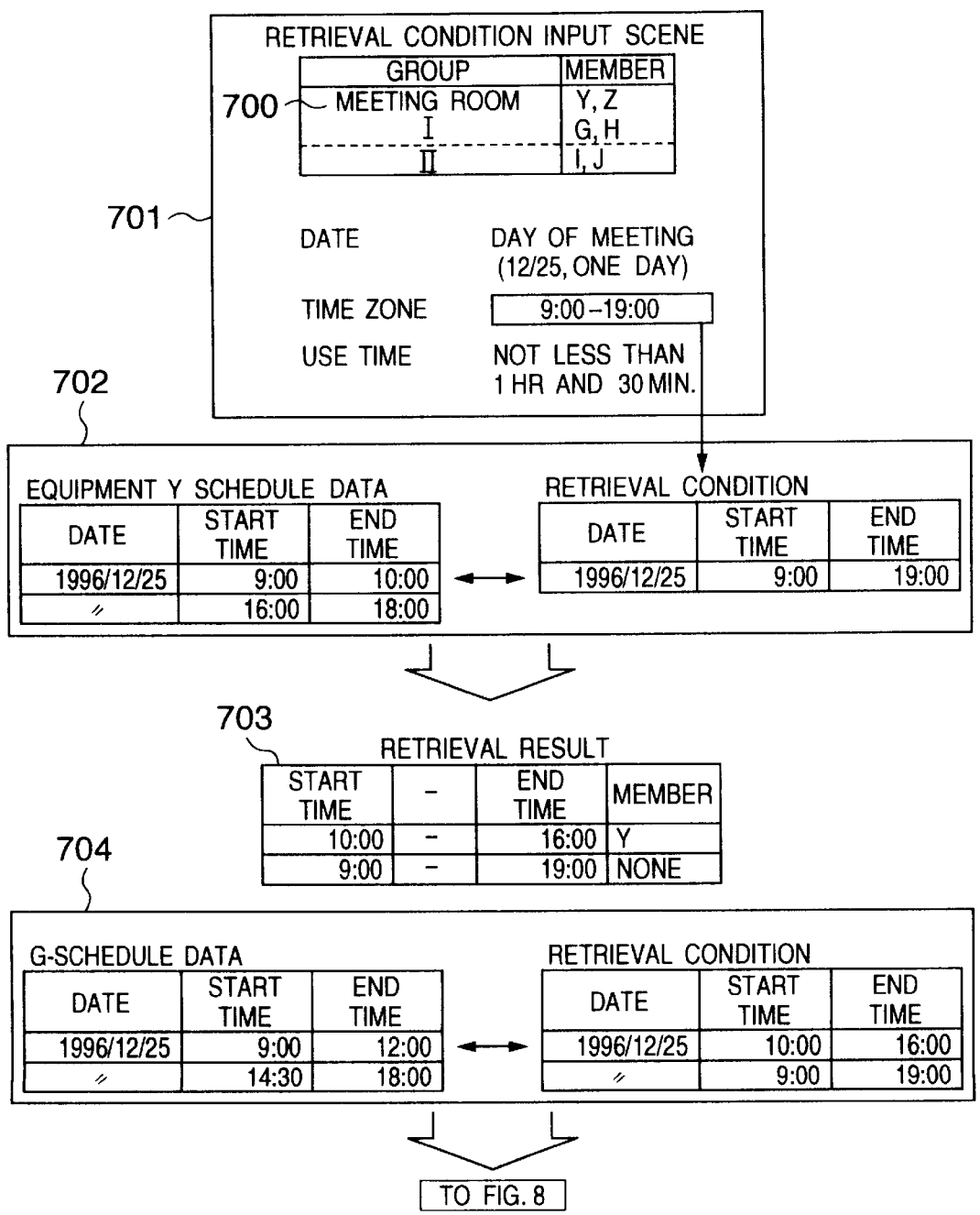
FIG. 7 is a processing view for explaining the embodiment of the present invention by way of specific example particularly in the case where special group definition is provided.

A retrieval condition may be inputted so that at least one person representing each group is required to attend the meeting. A specific example of such a case will be described with reference to FIGS. 7 and 8.

Incidentally, in this embodiment, it is assumed that a meeting room group 7000 is registered as a special group for schedules other than persons' schedules. The meeting room group includes equipments such as a meeting room, a tennis court, etc. In this embodiment, Equipment Y and Equipment Z are registered as the meeting room group.

First, it is assumed now that a retrieval condition 701 for idle time is inputted. An input condition is directly used as the retrieval condition so that idle time common to the Equipment Y and the input condition is retrieved (702).

The retrieval result is as shown in 703. Here, not only idle time common to the Equipment Y and the input condition is stored in the memory of the schedule server apparatus 114 but also the input condition expressing no member is stored in the memory.

The multistageous idle-time retrieval unit 112 is not used for the first group subjected to retrieval. For the second group et seq., retrieval is performed by the multistageous idle time retrieval unit 112. As retrieval stages, retrieval is performed for respective subjects of participation as shown in G 704, H 802 and I 804. Incidentally, also in this case, the retrieval result is added successively without changing the idle time as the previous retrieval result. Though not shown, the idle time retrieval goes to retrieval of idle time common to the Equipment Z and the retrieval condition and retrieval of idle time common to G and the retrieval condition when the retrieval up to J is completed. Finally, if only the schedule including at least one element from each group is outputted as the retrieval result, the result may be that which is expected by the host person.

As described above, the idle time retrieval is divided multistageously so that the retrieval result can be narrowed to a result intended by the host person.

Further, degrees of significance are given to subjects of participation for the meeting so that a time zone in which essential participants can attend the meeting can be retrieved. Accordingly, a burden on the host person can be also lightened.

Furthermore, idle time can be retrieved so that at least one participant or at least one equipment such as a room satisfies the condition necessarily.

Alternatively, the schedule server apparatus 114 may be replaced by an exclusive-use server apparatus.

Alternatively, the person and equipment retrieval unit may be provided in the client apparatuses 101, 102, . . . , not in the schedule server apparatus 114.

As is obvious from the above description, in the computer system according to the present invention, the multistageous idle-time retrieval unit is used so that the retrieval result for the subjects of participation for the meeting or for the place where the meeting is to be held can be narrowed easily and speedily. Accordingly, labor and time required for the host person's determination of the term in which the meeting is to be held can be lightened significantly.

Further, degrees of significance are set to the subjects of participation respectively so that a time zone in which essential participants can attend the meeting necessarily can be retrieved. Accordingly, a burden on the host person can be also lightened.

In addition, idle time can be retrieved so that at least one participant or at least one equipment such as a room satisfies the condition necessarily.

What is claimed is:

1. A schedule retrieval method for retrieving a schedule, comprising:
    a first step of accepting a first conference-holding condition of said schedule;
    a second step of dividing a subject people of said schedule into a plurality of groups;
    a third step of comparing one group in said plurality of groups obtained by division with said first conference-holding condition to make a coincident result be a second conference-holding condition;
    a fourth step of comparing one of said plurality of groups, which is not yet compared with any previous conference-holdinig conditions, with said second conference-holding condition to make a coincident result be a third confcrence-holding condition;
    a fifth step of comparing repeatedly all the remaining ones of said plurality of groups which are not yet compared with conference-holding conditions previously as a retrieval result; and
    a sixth step of outputting said retrieval result obtained by said fifth step.

2. A schedule server apparatus coupled to terminal apparatuses allocated to schedule-reserving persons and schedule-reserved persons through a communication line for retrieving idle time of a schedule, comprising:
    communication control means for transmitting data to said terminal apparatus and receiving data from said terminal apparatuses; and
    multistageous idle-time retrieval means having a function of dividing each of schedules registered for a plurality of people and a plurality of people equipments into a plurality of groups and retrieving common idle time from one of said plurality of groups to make an idle-time retrieval result be a following retrieval condition for retrieving idle time from the schedule of another one of said plurality of groups.

3. A schedule server apparatus according to claim 2, wherein degrees of significance are given to participants respectively so that schedules of said participants are grouped in the order of the degree of significance to thereby output idle time correspondingly to the degrees of significance.

4. A schedule server apparatus according to claim 2, further comprising means for making registration for a special group, wherein idle time is retrieved so that at least one of participants and equipments in said special group satisfies a condition.

5. A recording medium having computer readable program code means embodied therein for causing a computer to retrieve therefrom idle time of a schedule comprising:
    accepting a first conference-holding condition of said schedule;
    dividing a subject people of said schedule into a plurality of groups;
    comparing one group in said plurality of groups obtained by division with said first conference-holding condition to make a coincident result be a second conference-holding condition;
    comparing one of said plurality of groups, which is not yet compared with any previous conference-holding conditions, with said second conference-holding condition to make a coincident result be a third conference-holding condition;
    comparing repeatedly all the remaining ones of said plurality of groups which are not yet compared with conference-holding conditions previously to obtain as a retrieval result; and outputting said retrieval result obtained.

6. A schedule server apparatus according to claim 2, wherein said multistageous idle-time retrieval means further provides a visual display of said idle-time retrieval result at selected ones of said terminal apparatuses.

7. A schedule server apparatus according to claim 6, further comprising means for making registration for a special group, wherein said idle time is retrieved so that at least one of participants and equipments in said special group satisfies said retrieval condition.

8. A schedule server apparatus according to claim 2, further comprising a plurality of databases which store schedules of subjects of participation and a host person, and schedules of equipments.

9. A schedule server apparatus according to claim 8, further comprising data access means which accesses selected ones of said plurality of databases in accordance with instructions of said multistageous idle-time retrieval means.

10. A scheduling management system, comprising:
a schedule server comprising databases which store schedules of participants and schedules of equipments reserved by ones of said participants, and a multistageous idle time retrieval unit which divides schedules registered for participants and equipments into a plurality of groups and retrieves an idle time common from one group as a retrieval condition for retrieving an idle time common for another group of said plurality of groups; and a plurality of remote client devices operatively connected to said schedule server, which allow client users to input schedules of said participants and request an idle time retrieval from said schedule server.

11. A schedule management system according to claim 10, wherein said schedule server further comprises a communication controller which provides a visual display of said idle time retrieval at selected ones of said client devices.

12. A schedule management system according to claim 10, wherein said schedule server further comprises a communication controller which provides registration for a special group, wherein said idle time is retrieved so that at least one of participants and equipments in said special group satisfies said retrieval condition.

13. A schedule management system according to claim 10, wherein said schedule server further comprises a data access unit which accesses selected ones of said databases in accordance with instructions of said multistageous idle-time retrieval unit for retrieving the idle time common from said plurality of groups.

14. A schedule management system according to claim 10, wherein a degree of significance is provided to said participants respectively so that schedules of said participants are grouped in the order of said degree of significance to thereby produce the idle time corresponding to said degree of significance.

* * * * *